No. 743,227. PATENTED NOV. 3, 1903.
F. A. BIEHN.
WRENCH.
APPLICATION FILED DEC. 2, 1901.
NO MODEL.

WITNESSES: INVENTOR.
Frank A. Biehn
BY
Rummler & Rummler
his ATTORNEYS.

THE NORRIS PETERS CO., PHOTO-LITHO., WASHINGTON, D. C.

No. 743,227.

Patented November 3, 1903.

UNITED STATES PATENT OFFICE.

FRANK A. BIEHN, OF CHICAGO, ILLINOIS, ASSIGNOR OF ONE-HALF TO WILLIAM R. RUMMLER AND EUGENE A. RUMMLER, OF CHICAGO, ILLINOIS.

WRENCH.

SPECIFICATION forming part of Letters Patent No. 743,227, dated November 3, 1903.

Application filed December 2, 1901. Serial No. 84,373. (No model.)

*To all whom it may concern:*

Be it known that I, FRANK A. BIEHN, a citizen of the United States of America, and a resident of Chicago, in the county of Cook and State of Illinois, have invented certain new and useful Improvements in Wrenches, of which the following is a specification.

The main object of my invention is to provide a simple, effective, and inexpensive form of wrench adapted to grip the cover of a fruit-jar for the purpose of tightening or unscrewing the same. I accomplish this object by the device shown in the accompanying drawings, in which—

Figure 1:
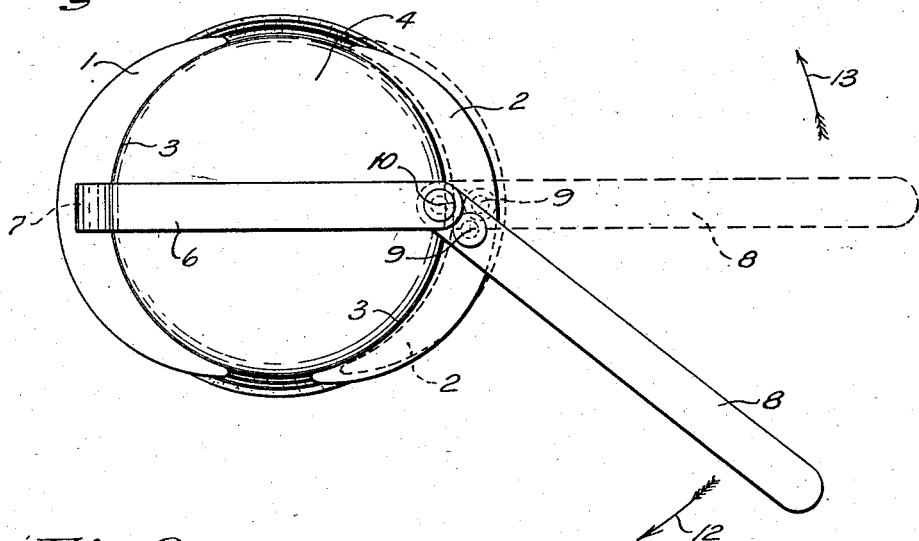
Figure 2:
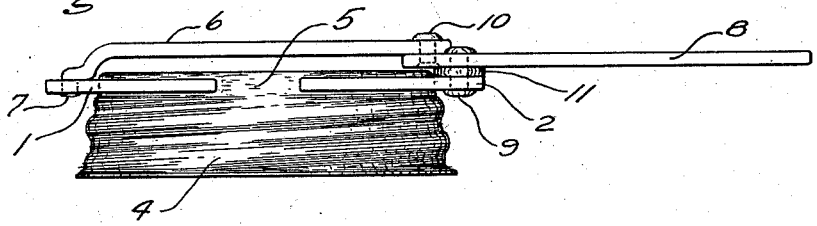

Figure 1 is a top plan of a device constructed according to my invention, showing same applied to the cover of the ordinary form of fruit-jar. Fig. 2 is a side elevation of the same.

In the device shown the crescent-shaped members 1 and 2 each have a surface 3 adapted to fit a fruit-jar cover 4 at opposite sides of the periphery of the groove 5, which is commonly formed at the upper part of such covers. The arm 6 is rigidly secured to the member 1 at 7. The lever 8 is pivoted to the member 2 at 9 and to the arm or jaw-shank 6 at 10. A washer 11 separates the lever 8 from the member 2 a sufficient distance, so that the lever 8 will clear the top of the cover 4 when the members 1 and 2 are seated in the groove 5.

The operation of the device shown is as follows: The wrench is applied to the cover with the members 1 and 2 at opposite sides of the periphery of the groove 5 and with the lever 8 in the position shown by the dotted lines in Fig. 1. If it is desired to tighten the cover upon the can, the lever 8 will be thrown into the position shown by the full lines in Fig. 1. The lever when drawn in the direction of the arrow 12 will turn about the pivot 10 and draw the members 1 and 2 toward each other, causing same to grip the cover, said grip increasing with the pull. If it is desired to unscrew the cover, the lever will be thrown in the direction of the arrow 13, when the members 1 and 2 will again be drawn toward each other and the grip of same increased by the continued pull upon the lever 8 in the direction required for unscrewing said cover. When the lever is turned toward either side, the gripping-surfaces of the members 1 and 2 will press uniformly against the periphery of the cover 4. The member 2 has a tilting movement on the pivot 9, which insures uniform pressure against the cover at each side of the arm 6. This avoids crushing the cover out of its circular shape.

It will be seen that some of the details of the device shown may be altered without departing from the spirit of my invention. I therefore do not confine myself to such details, except as hereinafter limited in the claims.

What I claim as my invention, and desire to secure by Letters Patent, is—

1. A wrench comprising a lever and a jaw-shank pivotally connected; said jaw-shank having rigid thereon an outer jaw facing toward said pivotal connection and with a gripping-surface extending transversely of the shank on each side of same; an inner jaw pivoted directly to said lever; said inner jaw having a gripping-surface extending on each side of its pivotal connection and facing toward the outer jaw; the point of pivotal connection of said shank and lever being located between the two jaws, substantially as described.

2. A wrench comprising a handle, an outer jaw pivoted at one end of said handle and having an inner curved gripping-surface extending in substantially the arc of a circle, and an inner jaw pivoted to said handle inward of said end and being free to oscillate on its pivotal connection independently of said outer jaw, said inner jaw having a gripping-surface extending in a curve from each side of its pivotal connection and disposed toward the gripping-surface of the outer jaw, said outer jaw having its pivotal connection to the handle located outside of the center about which said arc is drawn, said pivotal connections being suitably arranged with respect to each other to cause said jaws to be drawn toward each other through a movement of said handle, substantially as described.

3. A wrench of the type set forth, comprising an operating-lever, and a pair of arc-shaped jaws pivoted to the lever centrally of their length with the pivotal points relatively fixed and in horizontal alinement with the lever and being located one to the rear of the other, the pivotal point of one of the jaws with said lever being outside of the center of the arc of said jaw.

4. A wrench of the type set forth comprising an operating-lever, and a pair of arc-shaped jaws pivoted to the end thereof at different points but in horizontal alinement with the lever, one of the jaws being pivoted within the center of its arc, and the other jaw being pivoted without the center of its arc.

5. A wrench of the type set forth, comprising a lever and a pair of arc-shaped jaws pivotally supported on the end of the lever, at different points which are relatively fixed, and in horizontal alinement with the lever, the pivotal point of one of the jaws with said lever being outside of the center of the arc of said jaw.

6. A wrench of the type set forth comprising a lever and arc-shaped jaws operating independently of one another, the jaws being pivoted to the lever at relatively fixed points in horizontal alinement therewith, the pivotal point of one of the jaws with said lever being outside of the center of the arc of said jaw.

Signed at Chicago this 26th day of November, 1901.

FRANK A. BIEHN.

Witnesses:
 WM. R. RUMMLER,
 EUGENE A. RUMMLER.